United States Patent Office.

RUDOLF SCHMITT, OF DRESDEN, SAXONY, ASSIGNOR TO DR. F. VON HEYDEN, NACHFOLGER, OF RADEBEUL, NEAR DRESDEN, GERMANY.

MANUFACTURE OF OXYCHINOLINE CARBONATES.

SPECIFICATION forming part of Letters Patent No. 355,842, dated January 11, 1887.

Application filed September 3, 1886. Serial No. 212,627. (No specimens.)

*To all whom it may concern:*

Be it known that I, RUDOLF SCHMITT, a subject of the King of Saxony, residing at Dresden, in the Kingdom of Saxony, in the German Empire, have invented a new and Improved Process of Manufacturing Oxychinoline Carbonates, of which the following is a specification.

This invention, relating to the manufacture of oxychinoline carbonates, consists in treating oxychinoline alkalies and earthy alkalies with carbonic acid under pressure and at an elevated temperature, as hereinafter described. In the same way as the dry phenolates of the alkalies and earthy alkalies can be converted by treatment with carbonic acid under pressure and at an elevated temperature into the corresponding oxycarbonates, the dry chinophenolates (oxychinoline) of the alkalies and earthy alkalies can by a similar reaction be effected by treatment with carbonic acid under pressure, and at an elevated temperature be transformed into the corresponding salts or oxychinoline carbonates.

I will describe by way of example the conversion of ortho-oxychinoline-sodium into ortho-oxychinoline-sodium-carbonate. The sodium salt of the ortho-oxychinoline, being soluble with difficulty in cold alcohol, but readily soluble in heated alcohol, is readily obtained when the ortho-chinophenol is neutralized with a heated alcoholic soda lye. The salt when thoroughly dry is submitted to the action of carbonic acid under pressure in a digester heated to from about 130° to 150° centigrade. The conversion takes place quantitatively according to the following equation:

$$C_9H_6N(ONa) + CO_2 = C_9H_5N\genfrac{}{}{0pt}{}{COONa}{(OH)}$$

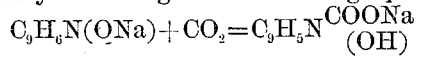

Chino-phenol-sodium =     Chino-phenol-sodium-carbonate.

The salt of the new acid formed is dissolved in heated water and on cooling crystallizes in beautiful needles. The free acid is separated from the heated solution of the sodium salt by the introduction of a suitable quantity of an organic acid. The acid crystallizes out of heated water in long yellow needles containing one molecule of crystal water, which separates at about 110° centigrade. The anhydrous compound is colorless. The acid also forms readily crystallizing salts with acids. The hydrochloric acid salt is obtained with especial facility, being readily soluble in the heated acid, and on cooling separates in the form of very beautiful crystals. These salts are decomposed by water. These properties facilitate to a remarkable degree the production of free chino-phenol-carbonate in a state of purity. Four atoms of hydrogen can be added to the same in like manner as to ortho-oxychinoline. The process of methylating can also be performed without difficulty. The isomeric oxychinolines are converted into the corresponding carbonates in like manner.

What I claim as my invention, and desire to secure by Letters Patent, is—

The process of obtaining oxychinoline carbonates from oxychinoline alkalies and earthy alkalies, consisting in the treatment of said alkalies and earthy alkalies with carbonic acid under pressure and at an elevated temperature, substantially as hereinabove described.

In testimony that I claim the foregoing as my invention I have signed my name in presence of two subscribing witnesses.

RUDOLF SCHMITT.

Witnesses:
PAUL DRUCKMÜLLER,
WILHELM WIESENHÜTTER.